United States Patent [19]

Thery

[11] Patent Number: 4,557,231
[45] Date of Patent: Dec. 10, 1985

[54] COMBUSTION CHAMBER OF A RECIPROCATING INTERNAL COMBUSTION ENGINE WHICH PROMOTES A ROTARY COMBUSTION TURBULENCE

[76] Inventor: Georges E. Thery, 6,place du Général Leclerc, Pierrefitte, France, 93380

[21] Appl. No.: 402,555

[22] Filed: Jul. 28, 1982

[51] Int. Cl.[4] ............................................. F02B 23/00
[52] U.S. Cl. ................................... 123/279; 123/667; 123/671; 123/193 CH; 123/262; 123/263; 123/193 P; 123/306
[58] Field of Search ................ 123/661, 667, 193 CH, 123/193 CP, 289, 279, 307, 306, 262, 263, 659, 193 P, 290, 671

[56] References Cited

U.S. PATENT DOCUMENTS

| 2,504,036 | 4/1950 | Morrison | 123/279 |
|---|---|---|---|
| 3,015,321 | 1/1962 | Stumpfig | 123/289 |
| 3,166,051 | 1/1965 | Hallberg | 123/289 |
| 3,304,922 | 2/1967 | Hideg | 123/262 |
| 3,504,681 | 4/1970 | Winkler | 123/279 |
| 4,143,624 | 3/1979 | Schmidt | 123/193 P |
| 4,235,203 | 11/1980 | Thery | 123/275 |
| 4,294,207 | 10/1981 | May | 123/279 |
| 4,359,027 | 11/1982 | Scharpf | 123/193 P |
| 4,366,789 | 1/1983 | Eckert | 123/661 |

FOREIGN PATENT DOCUMENTS

| 2308700 | 2/1973 | Fed. Rep. of Germany | 123/279 |
|---|---|---|---|
| 2647091 | 4/1978 | Fed. Rep. of Germany | 123/279 |

Primary Examiner—Ronald B. Cox
Attorney, Agent, or Firm—Spencer & Frank

[57] ABSTRACT

Projecting parts of the piston and the cylinder head are formed in such a manner that two portions of the piston surface are spaced from the inner surface of the cylinder head and a third portion of the piston surface is next to the inner surface of the cylinder head when the piston is at the upper dead center point, said third portion of the surface comprising a zone which is at a distance from the inner surface of the cylinder head and forming a connecting surface between said two first portion, these latter forming, with the cylinder head, respectively, an initial combustion zone and an expansion zone for the gases originating from the combustion, while the connecting zone together with the cylinder head forms an opening for the passage of said gases from the first zone, guiding these latter along the cylinder head toward a wall of the expansion zone, the outline of which, in a plane containing the axis of the above-mentioned opening, is a line which is curved in the direction of the opening forming the means to generate a rotary turbulence in the combustion chamber.

6 Claims, 7 Drawing Figures

COMBUSTION CHAMBER OF A RECIPROCATING INTERNAL COMBUSTION ENGINE WHICH PROMOTES A ROTARY COMBUSTION TURBULENCE

BACKGROUND OF THE INVENTION

It has been noted that in the combustion chamber of a cylinder piston assembly of an internal combustion engine, the displacement of the flame front in a non-turbulent mixture takes place with insufficient speed. This combustion at too low a speed results in numerous disadvantages among which one would mention, as far as controlled ignition engines are concerned, a tendency to knock at full load, incomplete combustion at small load, decreased performance at any load level of the engine, etc. In addition, if the combustion mixture is not homogenous the combustion is still more uncertain as far as its completeness is concerned and the above-mentioned disadvantages are aggravated.

For many years, one has attempted to make improvements on the combustion chambers in order to eliminate these disadvantages.

Thus, it has been shown that if the piston is provided with a projecting part it is possible to avoid a rise in temperature of the still unburnt portion of the gaseous mixture and to delay in this manner its self-ignition and to reduce its tendencies to knock, or pinging.

Also to improve the combustion, it has been proposed to associate a projecting piston part, forming a partition of the chamber at the upper dead center point and to effect a direct injection into one of the sections of such a chamber. However, this technique has not been used in the industry because it presents the disadvantage of employing expensive direct injection. In addition, the pressure increase in the initial combustion zone is such that after the upper dead center point, an intense projection of the combusted gases toward the second part of the chamber takes place with reflection of these gases on the cylinder head generating an uneven combustion and an overall decreased turbulence since it is without direction.

In another prior device, a momentary partitioning of the combustion chamber at the upper dead center point is accomplished by means of a projecting part of the piston and a cavity in the cylinder head, said projecting part of the piston being provided with an upper opening through which the gases originating from the initial combustion escape in the direction of the center of the chamber. The projecting part, being thin at the location of the above-mentioned opening, represents a very poorly cooled hot spot which is a source of self-ignition of the mixture making its application practically impossible. Moreover, the above-mentioned opening is made very narrow in order to extinguish the flame and therefore results in the complication of re-ignition.

In certain engines of recent design, for the purpose of increasing the compression ratio, a mechanical turbulence is created by the rise of the piston with combustion in the zone of the turbulence. Also, with the homogeneity of the mixture having been reached before the upper dead center point, there is no interest in employing double intake. In addition, since the turbulence zone and the combustion zone contain the exhaust valve, the temperature at the end of the compression is very high and the tendency to knock remains significant which implies the utilization of an overall very lean mixture. Therefore, an increase in the compression ratio can only be achieved to the detriment of the specific power which is of the order of magnitude of diesels. However, the resulting increase in weight and expense is prohibitive.

In other engines, a flat cylinder head cooperates with a piston head which divides the chamber into two zones without communication openings at the upper dead center point.

The absence of an opening creates a higher temperature and a greater tendency for self-ignition and increased knocking. This tendency is more pronounced since this zone contains the exhaust valve. The volume of the initial zone is indeed designed to be small, in order to reduce the gaseous mass which self-ignites, but taking into account that this mass tends to be greater because of the impossibility of expansion before the upper dead center point, it remains nevertheless too great and, in this zone, continues to represent too large a portion for not creating any knocking.

The compression ratio of this engine should, therefore, be lower than the corresponding compression at the self-ignition temperature of a mixture of substantially stoichiometric richness.

Also known is a combustion chamber which is bounded by a piston equipped with a projecting part and a cylinder head provided with a cavity into which a lean mixture and a rich mixture are separately admitted, the latter on the side of the cavity. At the upper dead center point, the chamber is likewise partitioned and a communication opening is established between the zone with the rich mixture and the zone with the lean mixture. This arrangement involving two separate intakes is relatively costly, particularly as far as the arrangement of the piston head is concerned.

Finally, a recent arrangement is mentioned where, particularly during idling, there is admitted into a combustion chamber a mixture which, at the moment of intake, sweeps the chamber with a turning motion. It will be noted that this rotary turbulence is the result of a tangential feeding of the combustion chamber through a narrow opening having the effect of a nozzle, which is in parallel with the main feeding. This device makes it possible to generate gas dynamics before the combustion, promoting the latter. Nevertheless, one can believe that at the end of the compression phase, these dynamics are strongly dampened and have only a very small effect on the development and speed of the combustion. In any case, they concern only the operation of the engine when idling.

SUMMARY OF THE INVENTION

The invention relates to a combustion chamber—or to an engine comprising at least one thereof—which makes possible the creation of a gyratory motion of the gases during the actual combustion phase, a motion which increases considerably the combustion speed under all working conditions of the engine. The features of the invention, which will be explained in more detail below, are also applicable to the combustion chambers of Diesel engines, i.e. those in which the combustion is started before the completion of the injection of the fuel.

As far as Diesel engines are concerned, it is known that it is necessary to prepare an air/fuel mixture of sufficient proportions as to make it self-ignitable. In the chamber, there also has to be good fuel distribution, and the excess richness of the initial combustion zone, in whose vicinity the injector is located, must be remedied. Finally, it is necessary that the combustion of the residual charge, i.e. the portion of the mixture which remains unburnt when the pressure begins to decrease, be rapid because the cylinder bore is large.

Most of the Diesel engines known at the present time offer arrangements which satisfy all these requirements only in part. Thus, these arrangements are in the first place only concerned with the formation of the self-ignitable mixture. One deals, for example, with fixed chambers which are housed in the piston head where a turbulence is created before combustion in order to form this self-ignitable mixture. With the combustion originating at this level, there are large heat losses through the cylinder head which have an impact on the performance. In addition, the sweeping of these cavities is carried out very poorly. Finally, the turbulence in the combustion chamber is of the alternating type and, thus, has a limited effect. In other arrangements, the fuel injection takes place on a hot surface in order to provoke evaporation in this manner. There are also engines where the fuel is tangentially injected into a cavity of the piston or of the cylinder head. In this zone, a mechanical air turbulence is created in the direction of the injected jet to assure a limited fuel evaporation for the formation of a certain amount of self-ignitable mixture, which is not too large, in order to avoid too intense knocking.

This turbulence weakens during the compression when the injection begins and is practically nil at the upper dead center point as a consequence of the effect of the compression and of the displacement of the gases toward the cavity which it causes. These means which represent an improvement as far as knocking is concerned contribute nothing to the actual combustion. Concerning slow diesels, a significant quantity of self-ignitable mixture is created which, in view of the large dimensions of the chamber, makes it possible to reduce the total combustion time. Such a massive self-combustion produces very heavy knocking which it is necessary to resist mechanically, which leads to the reinforcement of the mechanical parts and thus to the construction of very heavy engines.

None of the known arrangements proposes any effective means for improving the combustion dynamics in order to reduce the combustion time and to ensure as complete a combustion as possible.

As is the case for controlled ignition engines, the specific means of the invention make it possible to noticeably improve the course of the combustion in a Diesel engine and to provide an overall solution to all the requirements for good functioning of these engines.

To this effect, the invention relates to a reciprocating internal combustion engine comprising at least one piston, one cylinder and one cylinder head which delimits a combustion chamber, the head of said piston being provided with a projecting part.

According to one of the main characteristics of the invention, said projecting part and the cylinder head are formed in such a manner that two portions of the piston surface are spaced from the inner surface of the cylinder head and a third portion of the piston surface is next to the inner surface of the cylinder head when the piston is at the uppe dead center point, said third portion of the surface comprising a zone which is at a distance from the inner surface of the cylinder head and forming a connecting surface between said two first portions, these latter forming, with the cylinder head, respectively, an initial combustion zone and an expansion zone for the gases originating from the combustion, while the connecting zone together with the cylinder head forms an opening for the passage of said gases from the first to the second zone, guiding these latter along the cylinder head toward a wall of the expansion zone, the outline of which, in a plane containing the axis of the above-mentioned opening, is a line which is curved in the direction of the opening forming the means to generate a rotary turbulence in the combustion chamber.

In a first embodiment, the above-mentioned zone which forms the connecting surface is located at the base of the projecting part and at its circumference.

In a second embodiment, the above-mentioned connecting zone is located at the top of the projecting part in a plane substantially axial to the cylinder.

These arrangements can be applied to different types of piston engines and the direction of the rotary turbulence can vary. In an engine with a hemispheric truncated cone cylinder head, the positioning of the opening at the top or at the base of the chamber at the upper dead center point creates, in relation to the axis of the engine, a vertical or horizontal turbulence. In engines with flat cylinder heads or slanted valves, this turbulence is horizontal or slanted.

In addition, means are provided for locating the onset of combustion in the compression zone as a function of the combustion conditions.

Thus, if a combustible mixture is completely admitted into the chamber before the onset of combustion, said chamber being equipped with a pinpoint ignition member, said ignition member is positioned in said initial combustion zone farthest away from said connecting zone forming said opening.

The engine can be fed by single or double intake.

In the case where at least the end of the intake of the combustible mixture is concurrent with the onset of the combustion, i.e. in a Diesel engine, the part of the combustion zone which is next to the above-mentioned zone which forms the connecting surface is located near the exhaust valve, and the intake by injection is directed toward this valve. The fuel jet is then divided into a weak part, directed toward said valve, and a strong part along the surface of the combustion zone formed on the protruding part of the piston, and this division is effected either by the piston during its travel preceding the upper dead center point or by means of double jet injection.

Finally, in the case of feeding by injection, an ignition member can be located in the initial combustion zone near the connecting zone mentioned above.

The principal effect of the means of the invention is to generate a peripheral swirling combustion turbulence with multiple consequences as far as controlled ignition engines as well as Diesel engines are concerned, and to remedy imperfections which have been observed until now.

One of these consequences lies in the shortening of the combustion time. In fact, the above-mentioned turbulence is constantly accelerated by the fact that the burning gases originating from the initial combustion cause peripheral sweeping of the chamber and set the still unburnt gases in motion in the direction of the initial zone.

In addition, the rotary turbulence ensures a complete homogenization of the chamber contents.

In particular, it is noted that the means of the invention create a turbulence which possesses, after the upper dead center point of the piston, a synergistic effect which shall be called "boomerang effect". This result could come from the fact that the products originating from the initial combustion zone are directed toward this zone at the circumference of the chamber. These products contain decomposition products, i.e. from a mixture which has been subjected to a first decomposition under the radiation effect of the combustion products, which, in this state, show a much greater ability to ignite than the mixture in its initial state. Thus, to the propagation coming from the flame front there is added a decomposition propagation of the products which precede it. These decomposed products are those which reach the initial combustion zone in the first place, and one could think that, because of their great tendency to ignite, a second propagation of the flame fromt is created proceeding along the projection of the products in countercurrent to the turbulence. This phenomenon leads to the conclusion that the combustion speed is greater than the speed of the turbulence itself.

A result of this very rapid combustion is that it is practically completed after about a twenty degree turn of the crankshaft after the upper dead center point, even when the engine is idling. It is thus seen that the combustion is completed while the chamber has pressure conditions which are close to the maximum pressure. Thus, there is nothing unburnt left when the pressure begins to decrease, which removes the difficulty which is always encountered, especially during idling, of burning this residual portion while the pressure of the chamber has decreased.

Finally, to this principal rotary turbulence the effect of the piston motion has to be added which causes, especially after the upper dead center point, a movement of the gas which is added to the rotary turbulence and makes it possible that the part of the mixture located in the center of the chamber is also brought into rotation.

These general consequences of the particular turbulence created by the means according to the invention make it possible to conceive engines which have specific advantages relative to their feeding as well as their technology. The prospects offered by the invention will be better understood in the course of the following description which is given as a purely indicative and non-limiting example which permits numerous advantages and secondary characteristics of the invention to be made clear.

BRIEF DESCRIPTION OF THE DRAWINGS

Reference is made to the attached drawings in which.

DESCRIPTION OF THE PREFERRED EMBODIMENTS

Figure 1A:
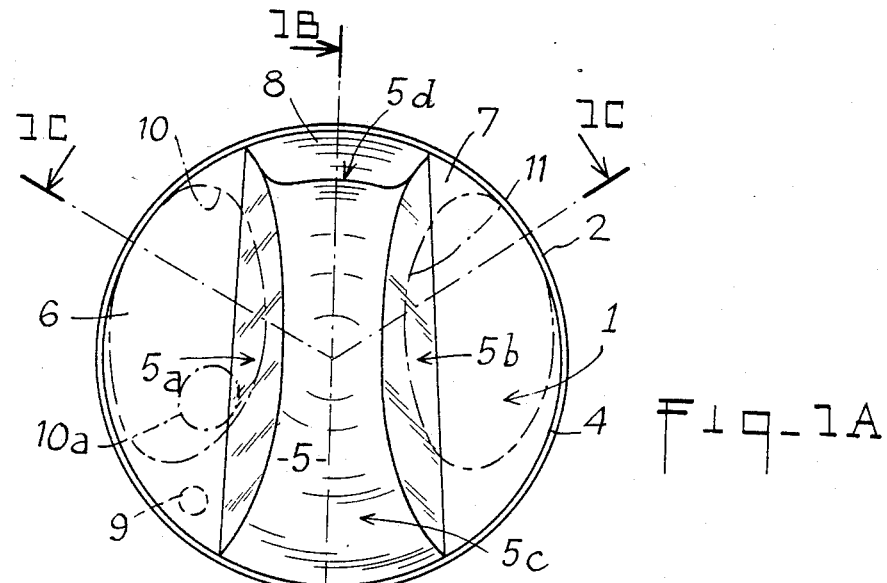
FIG. 1A is a diagram illustrating a first embodiment of the invention.
Figure 1B:
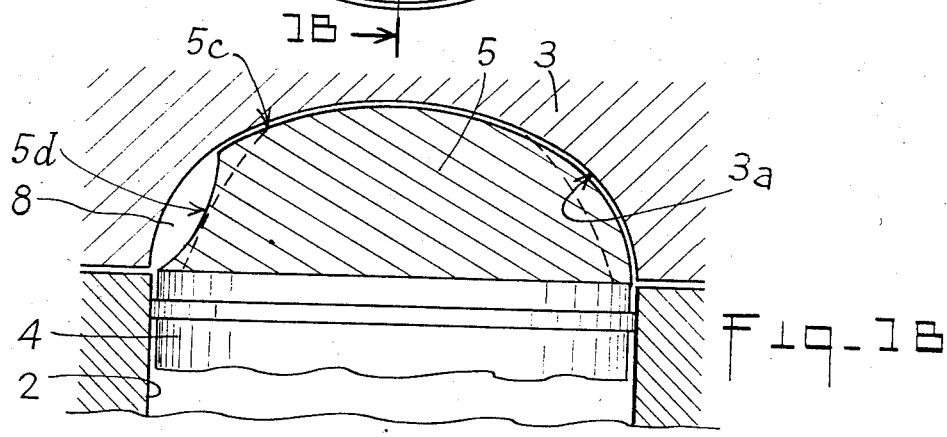
FIG. 1B is a partial sectional view along line IB of FIG. 1A.

Referring first to the first three figures, one sees a combustion chamber 1 bounded by a cylinder 2, a cylinder head 3 and a piston 4 sliding in the cylinder. The piston 4 carries a projecting part 5 at its top. This projection 5 is shaped in such a manner that it contains two surface portions 5a and 5b which are removed from the inner surface 3a of the cylinder head when the piston is at the upper dead center point (as shown in the drawings). These portions 5a and 5b are separated by a third surface portion 5c which, for its part, is next to the surface 3a when the piston is at the upper dead center point. This third portion 5c includes, at the base of the projecting part 5 and at its circumference, an indentation 5d which forms the connecting surface of the two first surface portions 5a and 5b across portion 5c. Thus, at the upper dead center point of the piston, the portion 5a together with the surface 3a of the cylinder head determines an initial combustion zone 6, while portion 5b together with surface 3a forms an expansion zone 7 for the gases derived from the combustion. The indentation 5d together with the surface 3a delimits an opening 8 for the passage of gases coming from zone 6 toward zone 7 during the combustion. It can be seen that, by means of this arrangement, said gases are guided along a peripheral path at the base of the chamber by the inferior cylindrical surface of the base of the cylinder head and of the cylinder, which tend to lead the gases in the direction of the passage opening 8. The thus guided jet generates a rotary turbulence in the combustion chamber around its principal axis with all the advantages stated above.

In FIG. 1A, zone 6 which is the initial combustion zone comprises an ignition member (spark plug) 9. The orifice of the intake line for the lean mixture, closed by a valve 10, comprises an internal line 10a for the intake of a rich mixture close to a lateral portion of the cylinder head. Valve 11 located in zone 7 is then the exhaust valve.

An application with a reversed valve arrangement can be adopted, especially if the fuel has a low self-ignition temperature. The exhaust valve is then located in the combustion zone 6. When there is a double intake line, the inlet line for the rich mixture is near the exhaust valve. This arrangement of the exhaust valve in the initial combustion zone will in particular be used preferably in the case of the intake of a homogeneous mixture through a single line together with a fuel having a low self-ignition temperature.

The internal line is, therefore, disposed in the main line closest to the part of the cylinder head which cooperates to form the initial combustion zone.

Thus, the onset of the combustion causes the projection of decomposition products of the non-ignited part from the initial zone toward the expansion zone which is thermally isolated from the seat of the initial combustion by the projecting part. These decomposition products, which are very easily ignitable, are thus in part neutralized during a first time in order to allow, after the movement of the piston has been reversed, this expansion zone to be very rapidly reached by the entire combustion.

In a construction variation where the intake of a double flux of mixtures takes place through a single valve, the lean mixture is air. On the air pipe, a stop-valve (of the butterfly type) can be disposed which closes this pipe when the engine runs in idle or during starting. The rich mixture alone is then admitted through the narrow section of the pipe but with high enough speed and a turbulence before combustion which is relatively strong, two conditions for increasing the speed of the combustion and to render it more complete at small load.

Figure 2A:
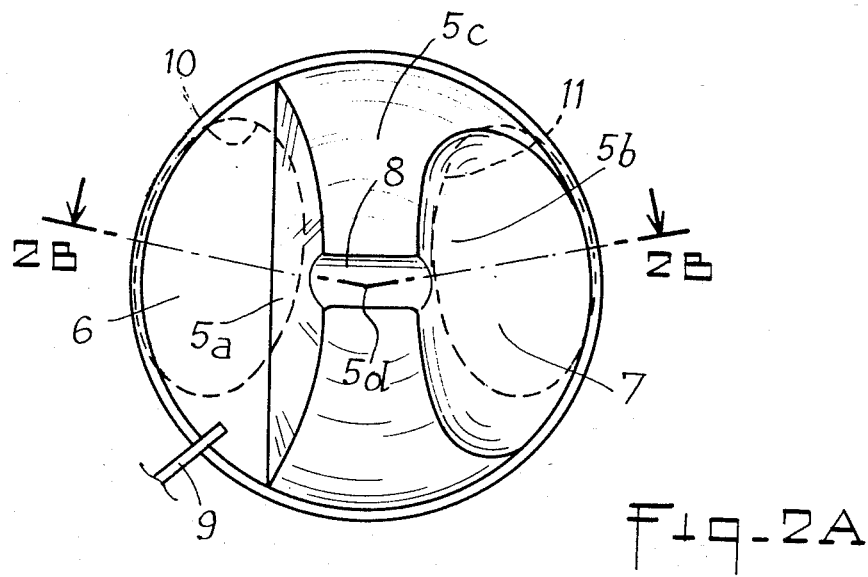
FIGS. 2A and 2B are schematic views of a second embodiment of the invention.
Figure 2B:
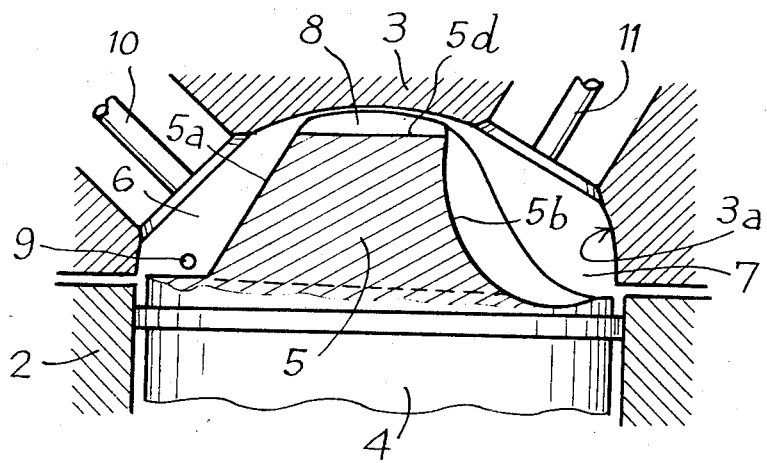

Concerning FIGS. 2A and 2B, the latter being a sectional view along line 2B of FIG. 2A, one finds again essentially the arrangements described above having the same references but in a different orientation. In fact, while the combustion turbulence in the example described above is created around a vertical axis of the cylinder, these figures illustrate an embodiment in which the turbulence has an axis which is practically orthogonal to that of the cylinder. One can see, in effect, that the surface 5d bounds the passage 8 at the top of the projecting part 5 and that the expansion zone 7 is designed in such a manner that it presents, in a plane which substantially contains both the vertical axis of the cylinder and the axis of the passage 8 (i.e. the plane of FIG. 2B), an outline in the form of a curved line for the purpose of guiding the gases coming from the initial combustion zone along a curved path which closes itself again in the vicinity of the passage 8 and which creates a rotary combustion turbulence having an axis which is substantially perpendicular to the above-mentioned plane. As one will observe, the ignition member will then be situated at the bottom of the initial combustion chamber.

By means of a double intake of air and of a very rich mixture to this type of engine, one can produce new controlled ignition engines which have a compression ratio that is higher than the compression ratio permitted by the self-ignition temperature of the fuel in its overall richness. In this manner, a compression ratio of at least 11 can be reached with a petroleum fuel whose octane number is 100 and which is admitted to the combustion chamber in stoichiometric proportion with air. One should be able to obtain a compression ratio in the order of 13, i.e. practically equal to that of diesels. In this case, the rich mixture will be very rich, with the richness being slightly lower in the vicinity of the spark plug, especially at the moment of ignition of the mixture concentration, in such a manner that its ignition can no longer take place. One will notice that, before the upper dead center point, the contents of the expansion zone are already homogenized by the onset of the turbulence according to the invention, especially by the design of this expansion zone. These contents, however, remain relatively lean and it will be arranged so that the richness will be lower than 0.8.

It will be advantageous that the volume of the initial zone is less than 40% of the total volume at the upper dead center point, so that the proportion of the self-ignitable products at the upper dead center point, contained in the initial zone, in relation to the total mass contained in the chamber, is too small to generate knocking.

At the onset of combustion, and due to the connecting opening, the mass of the products contained in the initial combustion zone is substantially reduced as a consequence of the volume increase of the gas and the mechanical compression.

This mass of products decreases as a function of the temperature and the pressure and, therefore, as a function of the knocking tendency itself. Due to said opening, only a very small part of this residual quantity can ignite, this part thus being negligible.

It must be mentioned that the essential arrangements of the invention have other consequences and allow for numerous opportunities as far as the construction of engines is concerned.

Above all, one would point out that the combustion speed is in any case increased. Thus, in the initial combustion phase, the arrangement of the ignition member opposite the opening causes a pneumatic thrust effect of the contents of the initial zone in the direction of the opening. Because of the narrowing of the gas passages at the level of the opening, the ignited gases join the gases in the process of decomposition and are the cause of a very noticeable increase in the propagation of the combustion.

In addition, the turbulence increases as a function of the temperature. One witnesses a progressive acceleration of the combustion speed until, for certain very small quantities of the mixture, the explosion limit is reached.

Furthermore, the unstable products and compounds, which are sources of knocking, are projected and drawn through the opening into the expansion zone where they are expanded and cooled. Thus, by this cooling there is produced a mechanical neutralization of the self-igniting effects of unstable compounds, which can substitute in part for the neutralization of these effects by chemical means which have been traditionally employed (addition of organo-metallic compounds to the fuel). A double intake by means of a double line or of a direct injection of a very rich mixture and of air makes it possible to render the chamber contents heterogeneous. This heterogeneity is maintained and preserved by the projecting part of the piston which at the upper dead center point traps a mixture in the initial combustion zone which is richer than that found in the expansion zone. A direct consequence of these arrangements is an important advantage of the invention which is the ability to increase the compression ratio to a value which, with a homogeneous mixture of the same richness, would cause knocking.

In fact, it has just been explained that knocking cannot take place in the initial combustion zone. Neither can it take place in the portion of the mixture which is contained in the expansion zone since, in this zone, the richness of the mixture is lower than would be the average richness of the mixture admitted in a homogeneous manner, and it is known that the tendency to knock is a direct function of the richness when it is lower than 0.85 for a mixture with a petroleum fuel base. The arrangements of the invention to create a rotary combustion turbulence make it possible to prevent the richness in the portion of the mixture from increasing before the upper dead center point.

In addition, after the upper dead center point, there is no longer the danger that knocking occurs, since also here the arrangements of the invention ensure a projection of the ignited products which creates a progressive combustion of the contents of the expansion zone, with the projection and the combustion having very similar propagation speeds.

In this manner it is possible to increase the compression ratio, to lower the overall richness of the mixture without increasing the risk of knocking.

The invention which permits retention of excellent combustion properties, in spite of the leaning of the mixture, also permits retention of good power properties, both from the point of view of temperatures as well as from the point of view of knocking tendencies.

Thus, with the same type of engine one can ensure either reduced fuel consumption or greater power, while at the same time reducing pollution.

In addition, the invention permits the use of non-petroleum fuels in spite of the problems which these present. In fact, not resolved are the problems of regularity of the functioning of such engines, due to their increased specific heat or their weak calorific power (difficulties in starting, idling, transition region), of specific power, of the homogeneity of the chamber contents and of the combustion speed. This process with the double intake device and the cut of the fuel supply to a lean mixture makes it possible to solve these problems.

In this case, the lean mixture is based on alcohol, on products originated from the catalytic decomposition of alcohol, on producer gas or city gas, etc.; the rich mixture whose richness cannot exceed unity, has a hydrocarbon base, an obturator closes the inlet line for the lean non-petroleum fuel mixture at starting and idle. Thus, the rich mixture plays the role of intake pilot, making possible starting, maintenance in idle and aiding the transition range. The complementary combustion at full load, of hydrocarbons with very high calorific power per volume unit increases the specific power.

In this case of application, the invention ensures a very large reduction in the knocking tendency, the homogenization of the chamber contents, a very rapid combustion without residues of incomplete combustion due to a constant acceleration of the combustion during its duration.

With the use of hydrated alcohol it is possible to obtain compression ratios which are higher than those corresponding to the use of a single fuel having a hydrocarbon base and exceeding by at least 2 points the compression ratio corresponding to the self-ignition temperature of the petroleum fuel, i.e. a compression ratio higher than 15 for a fuel with an octane number of 100.

One can also use city gas or producer gas. In this latter case, as compensation for the additional weight and cost resulting from a gas generator, this engine offers, as far as diesel is concerned, the advantages of a lighter engine as such and of lower costs for the same.

Figure 1C:
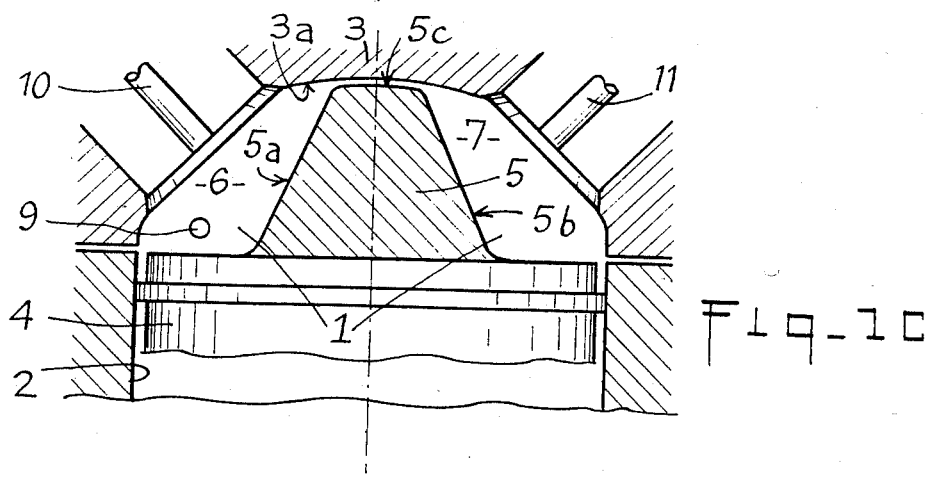
FIG. 1C is a broken sectional view along line IC of FIG. 1A.
Figure 3A:
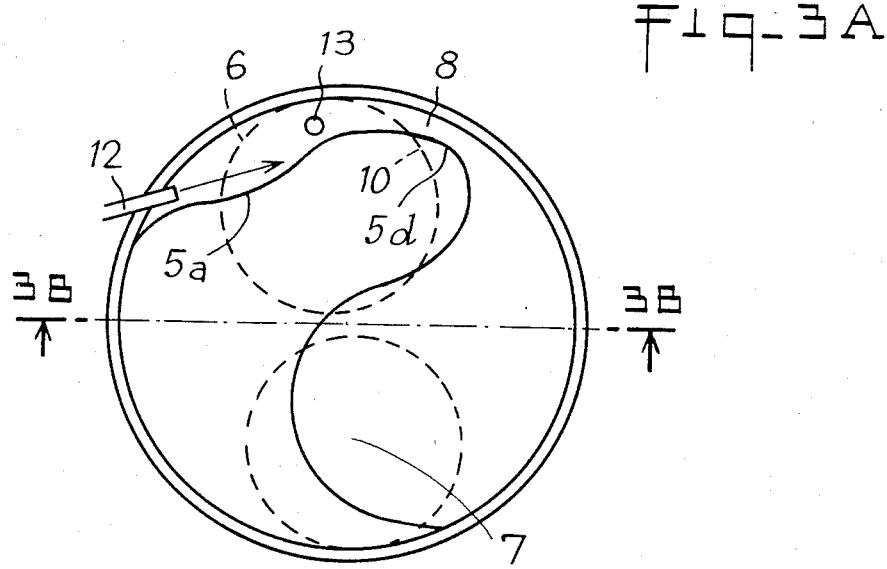
FIGS. 3A and 3B illustrate a variation of the embodiment of FIGS. 1A to 1C with a flat cylinder head and in a diesel or semi-diesel application.
Figure 3B:
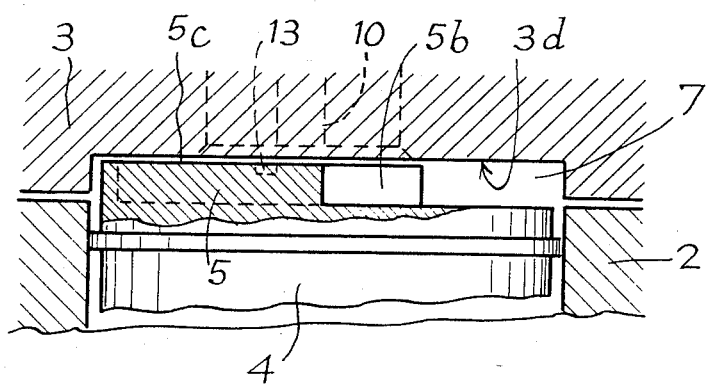

FIGS. 3A and 3B represent a variation of FIGS. 1A and 1C, with FIG. 3B being a sectional view along line 3B of FIG. 3A. In this variation one notices that the cylinder head 3 is flat, as is the projecting part 5 of the piston 4, with the zones 6 and 7 being laterally disposed between the projecting part and the cylinder head. The initial combustion zone 6 is provided with an injector 12 which is oriented in such a manner that the jet hits the projecting part of the piston near the communicating zone 8. At that moment, the injection jet is atomized. If the exhaust valve 10 is placed above this zone 8 and particularly next to zone 7, the portion of the atomized jet is heated by this valve and represents a portion of the mixture which is susceptible to self-ignition in the case of a Diesel engine. This portion of the mixture is relatively small which makes possible an initial ignition of a small mass without knocking (which is observed when there is self-ignition of a larger mass of the mixture).

Without leaving the framework of the invention, one can imagine that the injector 12 makes possible the feeding by a main jet which is directed toward the expansion zone and by a secondary jet of lower flow rate which is directed toward said exhaust valve.

Furthermore, a member 13 represents a poorly cooled refractory element which constitutes an incandescent point (either due to its poor cooling, or the Joule effect, or the catalytic effect) during the entire duration of the cycle. In this case it will be noted that the member 13 is disposed closest to the passage zone 8 which allows for an enrichment of the initial combustion zone without the combustion itself propelling uncombusted matter into the combustion zone.

The ignition of a small portion of the mixture can then be achieved by the radiation of this incandescent point which can only have pinpoint action, in contrast to the ignition of a macrocosmic quantity which has been used up to the present to lower the risk of uncombusted matter. This pinpoint ignition, apart from suppressing any knocking—especially during the functioning of the engine in idle—makes it possible to make these engines significantly lighter, to cut down on noise, which is of great interest for the slow diesels, and in the possibility offered to use any fuel, especially alcohol. The turbulence created by the means of the invention makes it possible to significantly lower the combustion time, to ensure self-sweeping of the initial zone and a complete combustion. Thus, while suppressing the knocking and making possible the construction of lighter engines, one achieves a much faster and more complete combustion in Diesel engines, which suppresses any ejection of uncombusted gases into the atmosphere and which makes possible a reduction in consumption of more than 10% for the most common types of engines (with a chamber in the cylinder head). In this application to Diesel engines, the invention opens very interesting perspectives, given the present conjunctural factors as far as material and fuel costs are concerned.

For engines running on gasoline the invention makes it possible, due to a combustion in two consecutive stages, which is equivalent to a double combustion, to reduce pollution.

an initial combustion before the upper dead center point accompanied by the release of the decomposing mixture into the expansion zone after its passage through the opening which is momentarily formed at the approximate upper dead center point.

a reactivation of this combustion due to the "boomerang effect", which has been explained above, which is caused by the direction given to the initial combustion products by the means of the invention and which takes place after the upper dead center point during the expansion phase.

Thus, the nitrogen oxide contents are decreased by avoiding too high a temperature before the upper dead center point. Products of an incomplete combustion are likewise avoided, since the rotary turbulence of the invention makes it possible to use a leaner mixture whose completed combustion is ensured (no ejection of hydrocarbons or carbon oxides.

One will notice that the invention allows considerable savings in consumption due to:

acceleration of the combustion in all operating regions and especially in idle. In fact, one knows that combustion is too slow during idling, and that a known arrangement made it possible to achieve savings of approximately 10% by improving the turbulence only during idle and essentially before the onset of combustion. However, in the invention, the turbulence is not limited only to the functioning during idling but concerns all regimes and the entire combustion phase;

suppression of excessive richness at full load. It is known that classically—and in an aberrant fashion—the highest power is achieved by enriching the mixture by approximately 20% which should ensure an acceleration of the combustion; in the invention, the increase in the combustion speed is achieved without employing this energy consuming artifice;

finally, possible increase in the compression ratio.

The invention in its application of double intake makes it possible that in the expansion zone a mixture is momentarily obtained which is too lean to self-ignite before the upper dead center point but which progressively ignites after the upper dead center point while simultaneously becoming enriched; avoiding the use of a mixture which is overall too lean to the detriment of the specific power. Apart from this advantage of enrichment simultaneous with ignition of the expansion zone, this process offers the specific advantage of a very rapid final combustion due to a rotary turbulence of the ignited products in a lean mixture which previously had been enriched in decomposition products. The combustion speed in such an environment is the same as for self-ignition. It can only be more accentuated by the projection and enrichment with ignited products.

The invention makes it possible to obtain an engine with preliminary fuel intake at a compression ratio which is higher than that corresponding to self-ignition of a homogeneous mixture of a richness which is equal to unity.

Finally, the invention makes it easily possible to produce a type of engine which operates either with hydrocarbons or with a non-petroleum fuel and the use of a mixture having a hydrocarbon base as pilot intake. The differences concerning essentially the piston and the intake, this passage from one mode of operation to another is made easy.

As far as combining the means of the invention and the method of double intake is concerned, it is pointed out that it makes possible the construction of engines with a large bore diameter, thus, for a given cylinder, with a short stroke. In effect, the admission of a rich mixture through an internal line, which is separate from the air intake, can take place practically at the extremity of a diameter of the chamber and can, therefore, lead to a fairly substantial heterogeneity between this extremity and the opposite extremity. It follows that the richness of the leanest part of the mixture is such that the compression ratio can be further increased. In addition, it makes it possible to employ large intake apertures.

In diesels, the pinpoint ignition suppresses the technical aberration constituted by an ignition which begins by a knocking and makes it possible to employ any fuel, including alcohol, which allows for vehicles which are independent of hydrocarbon supplies.

One can expect that the controlled ignition engines or Diesel constructed by applying the present invention will constitute a kind of new generation of internal combustion engines which, compared to the present engines, will offer a very low degree of pollution, a decreased consumption of petroleum products, improved efficiency, and, for diesels, especially for the heavy, slow diesels, a considerable reduction in weight.

The invention finds an interesting application in the construction of internal combustion engines.

It is not limited to the description given above but, on the contrary, covers all variations thereof without leaving its framework or its meaning.

I claim:

1. Reciprocating combustion engine comprising at least one piston, one cylinder and a cylinder head delimiting a combustion chamber, the head of said piston comprising a projecting part, said engine further comprising an exhaust valve and injector means for admitting a fuel mixture to said combustion chamber, and wherein said engine operates so that at least the end of the admission of the fuel mixture is concurrent with the onset of the combustion, characterized in that said projecting part and the cylinder head are shaped in such a manner that two first portions of the piston surface are spaced from the internal surface of the cylinder head and are separated from one another by said projecting part, and that a third portion of the piston surface has a first part which is next to the internal surface of the cylinder head when the piston is at the upper dead center point, said third portion of the surface comprising a second part which is at a distance from the internal surface of the cylinder head to form a connecting zone for said two first portions, these latter determining together with the cylinder head, respectively, an initial combustion zone and an expansion zone for the gases originating from the combustion, while said connecting zone together with the cylinder head forms an orifice having a longitudinal direction for passage of said gases from the initial combustion zone to the expansion zone along said longitudinal direction of said orifice and for guiding said gases along the cylinder head, wherein said expansion zone has a wall formed to have, in a plane extending along the longitudinal direction of said orifice, an outline which is curved in the direction toward said orifice, said wall is located in the path of gases flowing out of said orifice, and said wall and said orifice constitute means for imparting a rotary turbulence to gases in the expansion zone, and further characterized in that the part of the initial combustion zone which is next to said connecting zone is located in proximity to the exhaust valve and that said injector means is oriented to direct the fuel mixture in the direction of the exhaust valve.

2. Engine according to claim 1, characterized in that said injector means produces a fuel mixture divided into a weak part directed toward said valve and a strong part along the surface of the initial combustion zone which is formed by said projecting part.

3. Engine according to claim 2, characterized in that this division is accomplished by the piston during its travel preceding the upper dead center point.

4. Engine according to claim 3, characterized in that this division is accomplished by two separate injection jets having different flow rates.

5. Engine according to claim 1, further comprising an ignition member in the initial combustion zone in the vicinity of the connecting zone.

6. Engine according to claim 1, characterized in that said engine is of the Diesel type.

* * * * *